Sept. 5, 1939.   F. G. JOHNSON   2,172,048
WALL INSULATION
Filed April 23, 1936   2 Sheets-Sheet 1
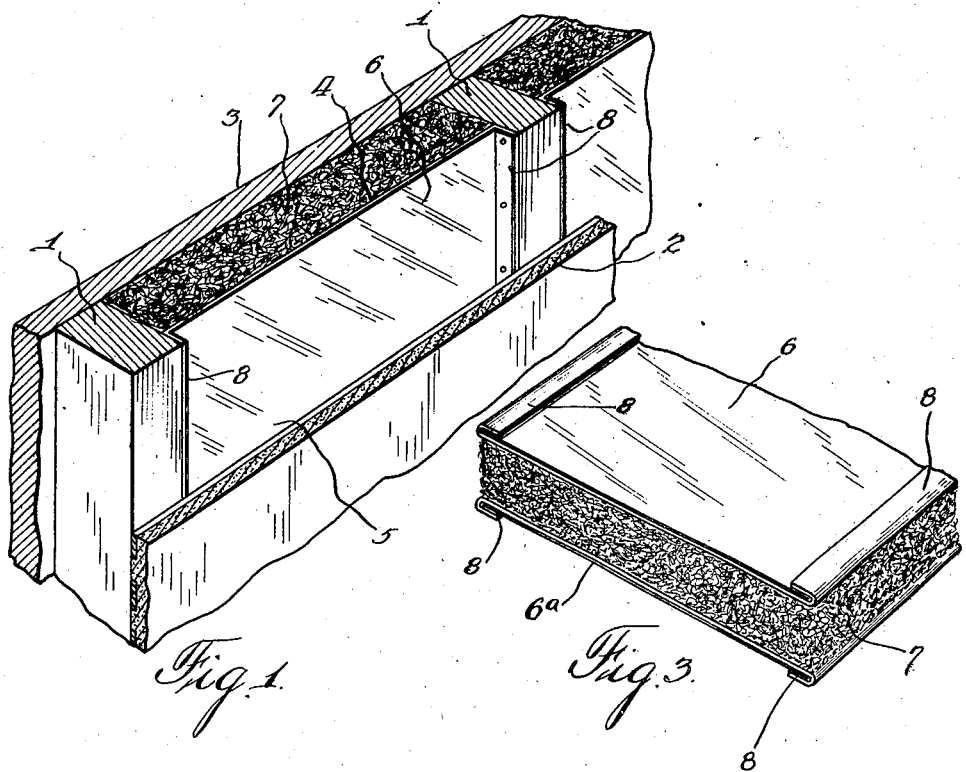
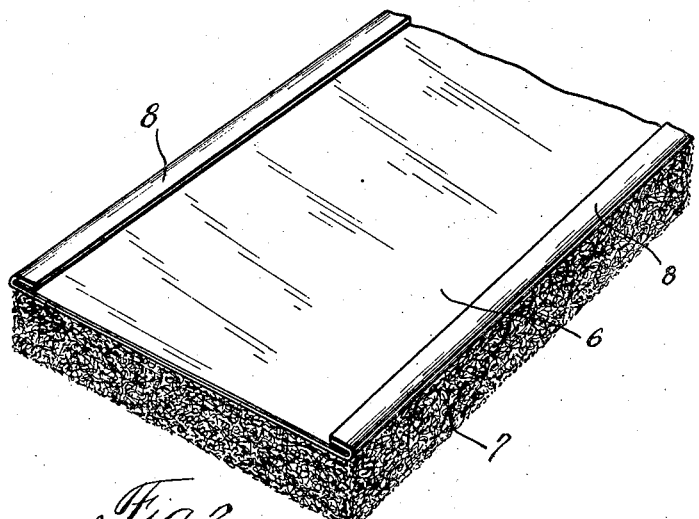

Sept. 5, 1939.  F. G. JOHNSON  2,172,048
WALL INSULATION
Filed April 23, 1936   2 Sheets-Sheet 2
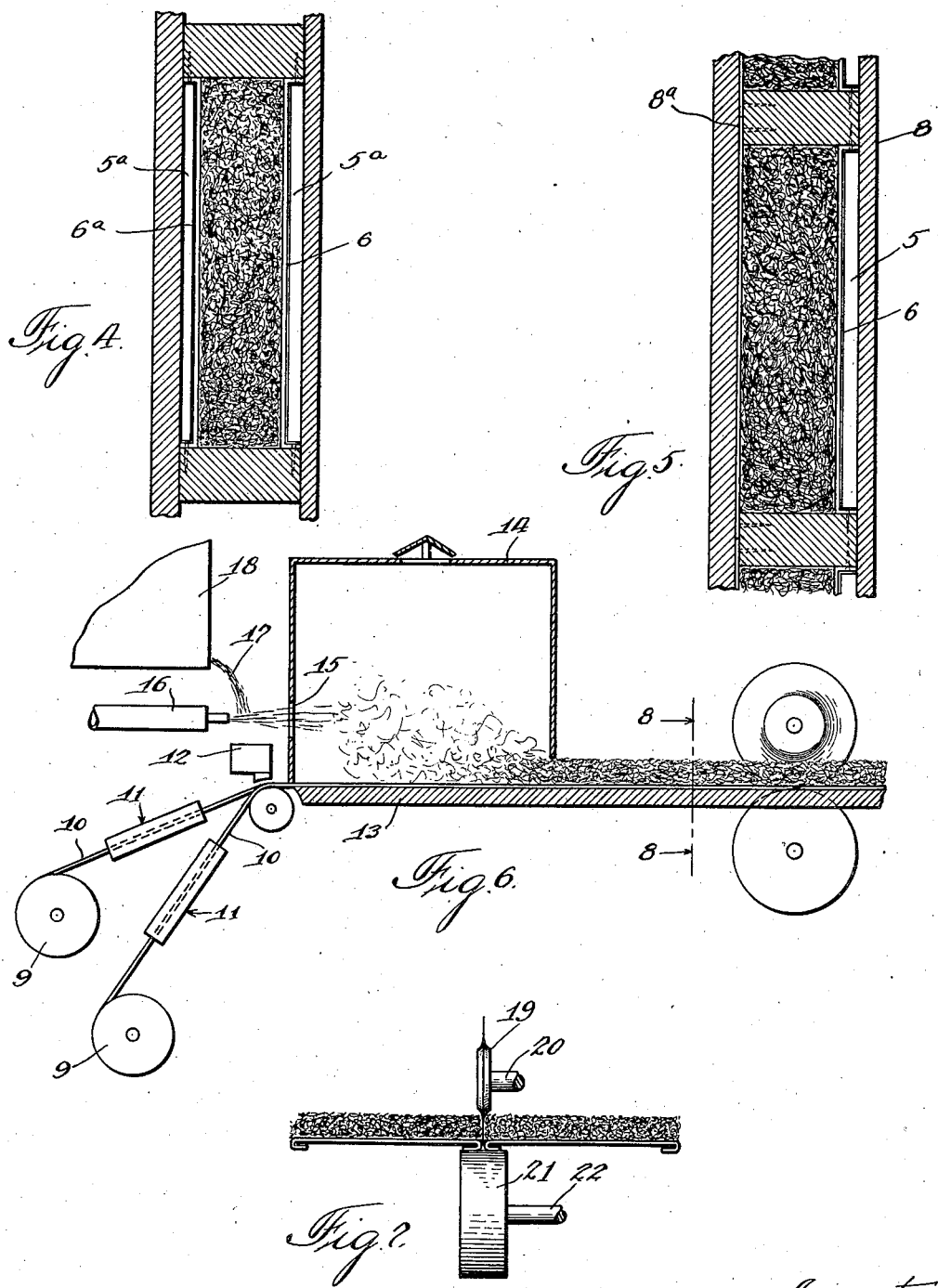

Patented Sept. 5, 1939

2,172,048

UNITED STATES PATENT OFFICE 2,172,048

WALL INSULATION

Fred G. Johnson, Chicago, Ill., assignor to United States Gypsum Company, Chicago, Ill., a corporation of Illinois Application April 23, 1936, Serial No. 75,981

3 Claims. (Cl. 20—4)

This invention relates to wall structures and insulation therefor and more particularly to such structures wherein a plurality of convection and conduction reducing elements are effectively combined with a radiant energy reflecting element of low emissivity and absorption, to greatly increase the over-all insulating value of the wall in which they are employed.

In the ordinary outside wall construction, there are studs with an interior wall of plaster or other material on the inner surface thereof and an exterior wall formed of sheathing and bricks, siding, or the like. Walls of this common type permit considerable transfer of heat by radiation, convection and conduction therethrough.

With the present invention, I have produced a wall construction which will keep the transmission, by any means, of the total amount of heat therethrough to a minimum. For this purpose I preferably employ a sheet of aluminum or other non-tarnishing foil which, due to its high reflectivity and low absorption and low emissivity, reduces heat transfer by radiation approximately 85 to 90 per cent. However, to accomplish this result the surface of the foil should bound an air space. I therefore so position the foil that it divides the air space between the studs.

In order to reduce heat transfer by conduction and convection, I preferably employ bats of light, porous insulating material which are positioned on one side of the foil in the space between the studs. Thus, on the reflecting side of the foil there is an air space, and on the other side there is the porous bat. To reduce the heat transfer by convection and conduction to a minimum, the whole space between the studs should be filled by the bats. However, this would bring the foil surface closely adjacent the inner or outer wall and materially reduce its effectiveness as a radiant-energy reflector. For this reason, the foil is spaced from either the inner or outer wall or from both, but this space, while being sufficient to permit the foil to function effectively as a reflector, is preferably sufficiently narrow to substantially prevent convection therein. As still air is a poor conductor of heat, this also serves to substantially prevent conduction. The foil also acts to prevent air infiltration through the bats and thus further reduces the transfer of heat by convection. Such a unit is therefore most efficient to prevent the transfer of heat by any means through a wall of this type.

It is an object of the invention to provide heat insulating wall structures which may be constructed in the usual manner of uninsulated walls and in which the improved insulating characteristics are obtained by the mere insertion of a peculiarly advantageous type of insulating unit into the usual hollow spaces of the wall structure.

A further object is the provision of an insulating unit particularly adapted for use with ordinary wall structures and which may be easily applied thereto in various relationships to provide desired insulating characteristics.

The present invention also contemplates the provision of an insulating bat which combines a plurality of insulating characteristics and is provided with novel means for supporting the bat in the usual hollow wall space, and which is constructed and arranged to enable quantity production at comparatively low cost while retaining high insulating characteristics.

It is also an object to provide a simple and convenient method of manufacturing an insulating unit having a particularly advantageous means associated therewith, whereby the unit may be mounted in a wall in various predetermined relationships.

Another object is the provision of a process of manufacturing a plurality of insulating strips or sheets simultaneously.

Further objects will be apparent from the specification and the appended claims.

In the drawings—

Figure 1 is a sectional perspective view of a wall structure illustrating one embodiment of the invention;

Fig. 2 is a fragmentary perspective view of one of the insulating units illustrated in Fig. 1 and having a fabric sheet on only one side;

Fig. 3 is a perspective view of a unit similar to that illustrated in Fig. 2, but having a fabric sheet on both sides;

Fig. 4 is a sectional view through the wall structure shown in Fig. 1 and illustrates one method of installing the double-faced unit shown in Fig. 3;

Fig. 5 is a similar sectional view through the wall structure and illustrates another method of mounting the double-faced unit in the wall;

Fig. 6 is a diagrammatic view illustrating a method of manufacturing the insulating units; and Fig. 7 is a sectional view taken on a line substantially corresponding to line 8—8 of Fig. 6 and illustrates the method of cutting the wool insulation between the fabric strips.

Referring to the drawings in detail, the embodiment illustrated comprises the usual spaced studding 1 or the like, such as are ordinarily used for supporting lath, and plaster 2 and sheathing 3, or other suitable coverings or structural elements arranged to define the usual hollow spaces in the structure.

In the embodiment illustrated in Fig. 1, a strip or sheet 4 of suitable flexible fabric, such as paper which is preferably substantially impervious to the passage of air therethrough, is mounted to form a partition spaced from the inner wall covering 2 to provide a comparatively shallow air space 5 therebetween. The fabric 4 is provided with a radiant-energy reflecting surface facing the air space 5. This surface may be provided in any suitable manner whereby its energy reflecting characteristics are substantially permanent. This surface may be non-metallic, or it may be metallized, or the surface may be obtained by coating the fabric with a thin sheet of substantially non-oxidizable metal, such as aluminum foil or its equivalent.

In the embodiment illustrated, a sheet of very thin metal foil 6 is adhesively secured to the paper 4, thereby providing a highly reflective surface facing the air space 5. The space on the opposite side of the fabric partition 4 is substantially completely filled with an insulating material 7 having an extremely low heat conductivity. This insulating material is preferably made of so-called glass wool which consists of a resilient, homogeneous, fibrous bat, flocculent or cotton-like in structure. The bat is secured to the fabric partition by any suitable means, such as adhesive, and is substantially supported thereby.

The sheet or strip of fabric 4 forming the partition is somewhat wider than the wool bat 7 and is provided with lateral flanges 8 which may be secured to the studding 1 by nailing, as shown, or in any other suitable manner. These flanges may also have a heat reflecting surface, although this is not essential.

The embodiment just described provides a wall structure combining in a most effective manner the insulating characteristics of a narrow air space, a fire resistant insulator of low conductivity, a partition substantially impervious to the passage of air thereto, and an efficient reflector of radiant-energy. The insulating and reflective elements may be combined in a single unit, such as illustrated particularly in Fig. 2, in which the flanges 8 are normally inturned and creased or hinged on a line substantially in alignment with the longitudinal edges of the wool bat.

Fig. 4 illustrates one method of mounting the unit shown in Fig. 3. In this embodiment the flanges 8 on both sides of the unit are positioned at right angles to the corresponding face of the unit and secured to the sides of the studding, as shown. This provides an air space 5a on each side of the insulating unit instead of only on one side. In the unit illustrated in Fig. 3, each of the paper sheets 4 is provided with a suitable substantially permanent heat reflecting outer surface, as indicated at 6 and 6a.

Fig. 5 illustrates another method of mounting the unit illustrated in Fig. 3, and in this construction the flanges on one side of the unit are turned outwardly, as indicated at 8a, and are secured to the face of the studding 1. The flanges 8 of the opposite fabric sheet are turned at right angles and secured to the side of the studding as illustrated, thereby providing the air space 5. With this construction, the heat reflecting surface 6a may be omitted.

Fig. 6 diagrammatically illustrates a method of manufacturing the wool bats or insulating units whereby a continuous strip of paper, having a substantially non-oxidizing energy reflecting surface, may be provided with a comparatively thick layer of flocculent insulating material having characteristics similar to glass wool.

The method illustrated is adaptable to the manufacture of a plurality of insulating strips simultaneously, if desired.

In practicing the method, one or more rolls 9 of suitably prepared fabric having a reflective surface are mounted as illustrated, and the webs or strips 10 are passed through suitable folding devices 11 whereby the longitudinal flanges 8 are folded underneath the webs, as illustrated in Fig. 7.

Adhesive, such as molten asphalt, silicate of soda, etc., is applied to the upper surface of the webs by any suitable means such as an adhesive applying device 12, which may be of any of the usual types. The strips may be supported for continuous movement over a suitable support 13. A chamber 14 is positioned above the webs, as illustrated, and provided with an inlet opening 15 into which is directed a jet of steam from the nozzle 16. A stream of molten material 17, of a character to produce a fiber such as is commonly known as mineral wool or glass wool, is directed from a container 18 and into the path of the jet of steam, by which it is carried into the chamber 14 and deposited on the webs in a light flocculent, homogeneous resilient layer of a desired thickness. The edges of the webs are positioned closely adjacent, substantially as illustrated in Fig. 7, and are preferably continuously moved by any suitable mechanism.

After the layer of insulating material has been deposited on the webs, they are passed under a suitable cutting device whereby the wool layer is cut longitudinally on a line between the webs. Any suitable cutting mechanism may be used. However, in the embodiment illustrated, a rotary knife 19 is secured to a driven shaft 20 and the webs are supported underneath the knife by means of a roller 21 driven in synchronism with the cutting knife 19. The roller 21 may be mounted on a shaft 22. This shaft, together with the shaft 20, may be driven from any suitable power source. The prepared strips may then be cut transversely into suitable lengths.

In commercial practice the bats are usually nine feet long, fifteen inches wide, and from two to four inches thick. It will, of course, be understood that they may be of any suitable dimensions to meet commercial requirements.

The insulating layer 7, which may be formed from materials other than glass wool, is preferably cotton-like in structure, having long, strong, tough fibers which produce a homogeneous, resilient mass of extremely light weight. Its natural resilience will cause it to return to substantially full thickness when compressed.

While only specific embodiments of the invention have been shown and described, it will be readily understood by those skilled in the art that various changes and modifications in detail may be resorted to without departing from the spirit and scope of the invention as set forth in the appended claims. For instance, instead of coating the fabric with aluminum foil, a thin metallic surface of other material may be used, or the surface may be non-metallic; that is, the fabric may be provided with any suitable surface having high radiant-energy reflecting characteristics.

It will also be understood that the claims are not intended to be specifically construed, except as required by the prior art, and that the terms used comprehend a proper range of equivalents, e. g., the term "wall" including ceilings, roofs and floors as well as vertical walls, etc.

What is claimed and desired to be secured by Letters Patent is:

1. A building wall structure comprising supporting members and a wall covering on each side with the inner surfaces of the wall covering facing a hollow space between said supports, a sheet of radiant-energy reflective material lying in said space parallel to the plane of said wall and spaced a short distance from one side thereof, a second sheet of radiant-energy reflective material parallel to said first sheet and spaced a short distance from said opposite wall, the reflective surfaces of both of said sheets facing narrow air spaces between said sheets and the adjacent wall coverings, and light porous substantially non-conducting insulating material positioned between and substantially filling the comparatively wide spaces between said two radiant-energy reflective sheets.

2. The method of making an insulating bat of the character described for a wall structure, comprising folding the longitudinal edges of a sheet of flexible fabric inwardly on itself to form flanges, applying adhesive to the side of said fabric opposite said folded-in flanges, then applying a thick coating of flocculent insulating material to said adhesive.

3. The method of making insulating bats of the character described for a wall structure, comprising folding the longitudinal edges of a plurality of strips of flexible fabric inwardly on said fabric to form flanges, supporting said strips with the flanged edges closely adjacent, applying adhesive to said strips on the side opposite said flanges, depositing a continuous thick layer of flocculent insulating material on said adhesive, then cutting said layer in two between said strips.

FRED G. JOHNSON.